United States Patent [19]

Tennutti

[11] 4,205,932

[45] Jun. 3, 1980

[54] INSERTED-BLADE CUTTER ASSEMBLY

[75] Inventor: Michael G. Tennutti, McHenry, Ill.

[73] Assignee: Illinois Tool Works Inc., Chicago, Ill.

[21] Appl. No.: 973,519

[22] Filed: Dec. 26, 1978

[51] Int. Cl.² .............................................. B26D 1/12
[52] U.S. Cl. ..................................................... 407/25
[58] Field of Search ....................... 407/23, 24, 25, 26, 407/27, 28, 29, 33, 58, 59

[56] References Cited

U.S. PATENT DOCUMENTS

| | | | |
|---|---|---|---|
| 1,393,818 | 10/1921 | Olson | 407/25 |
| 2,310,826 | 2/1943 | Adams | 407/25 |
| 2,567,167 | 9/1951 | Drader | 407/25 |
| 2,693,020 | 11/1954 | Pelphrey | 407/25 |
| 2,706,848 | 4/1955 | Riley | 407/25 |
| 3,175,275 | 3/1965 | Zorn | 407/25 |
| 4,023,246 | 5/1977 | Haug et al. | 407/25 |

Primary Examiner—Harrison L. Hinson
Attorney, Agent, or Firm—Richard K. Thomson; Robert W. Beart

[57] ABSTRACT

An inserted-blade cutter assembly uses a laterally projecting finger formed integrally with each removable blade which is engagable with a reference-positioning surface on the cutter body to precisely position the blade. Two locking caps have frustoconical surfaces which engage similarly shaped end portions of the blade members providing a sufficient radial force to counter centrifugal forces and thereby retain the blades in the body member. The locking caps also provide a sufficient axial force to keep the blade finger in contact with the reference-positioning surface to provide precise cutting tooth alignment during the cutting operation. This structure obviates the need for individual fasteners, shrink fits, or adhesives thereby facilitating blade removal and replacement.

8 Claims, 4 Drawing Figures

INSERTED-BLADE CUTTER ASSEMBLY

BACKGROUND OF THE INVENTION

The present invention relates to hobs, milling cutters and the like. More particularly, the invention relates to gear cutting tools which have inserted blades.

Inserted-blade tools are well known in the art. Such tools have many obvious advantages over solid cutters: (a) only the blades need be replaced when they become worn, rather than the entire tool; (b) the body portion can be made of relatively inexpensive material; (c) the replaceability of the blades permits the utilization of blades having different properties or characteristics thus enhancing the range of applications of the cutter; (d) the cutter may be more easily made by machining the individual blades rather than machining the blades in the necessarily cramped confines of the cutter body; and, (e) the user may repair or renovate the tool on site without the need to ship it to the manufacturer.

Though many attempts have been made to make full use of these advantages of the inserted-blade design, previous attempts have, for one reason or another, failed. Those designs using screws or wedges to hold the blades in place are complicated and hence, costly to manufacture, thus, negating the economic advantages of the design. In addition, renovation of the cutter becomes difficult and time consuming. In the replaceable-blade cutters using either an adhesive or a tight press fit to retain the blades in the body portion, the blades are replaceable in name only, since removal of the blades generally results in gouging, cracking, or otherwise damaging the body portion. Again, renovation, if it can be done at all, becomes laborious and time consuming.

SUMMARY OF THE INVENTION

It is, therefore, an object of this invention to provide an inserted-blade cutter in which the blades may be easily removed for replacement, yet securely held in the precise alignment necessary to effect cutting of a proper gear pattern.

It is a further object of this invention to provide a relatively simple, inexpensive inserted-blade cutter which may be easily manufactured.

These objects of the invention are achieved by providing a reference-positioning surface on the cutter body member. Each blade has an abutment means formed integrally therewith and adapted to contact the reference-positioning surface to precisely locate the blade relative to the body member and relative to the adjacent blades. Two locking caps, each having a frustoconical side which engages a respective similarly shaped opposite end portion of the blade members to retain them in the slots of the body member, are mounted one on either end of the body member. The tapers on the frustoconical side of each cap and of the blade ends are such that the radially inward force is sufficient to counter any possible centrifugal forces tending to displace the blades out of the body member and the axial component is sufficient to maintain the abutment means in contact with the reference-positioning surface during the cutting operation.

The foregoing and other objects and advantages will become more apparent from the following detailed description when considered in conjunction with the accompanying drawing, wherein like reference numerals throughout the various views are intended to designate similar elements.

DETAILED DESCRIPTION OF THE PREFERRED EMBODIMENT

Figure 1:
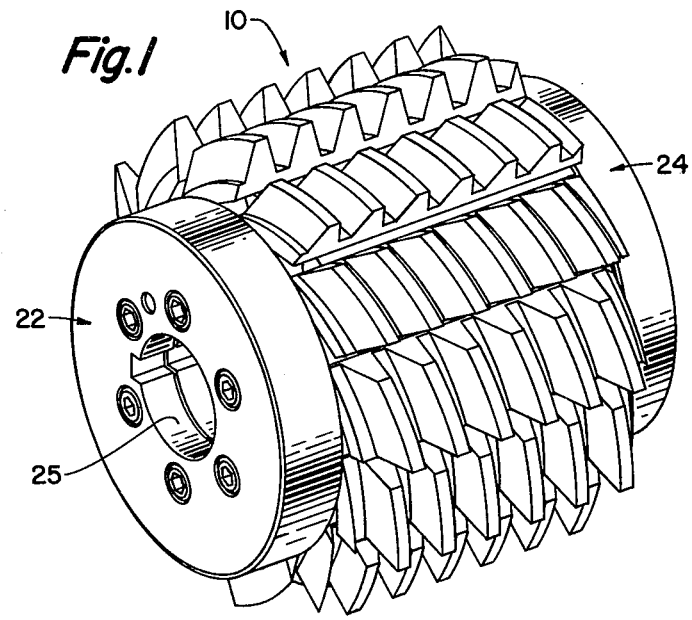
FIG. 1 is a perspective view of an inserted-blade cutter according to the present invention.

The inserted-blade cutter assembly depicted in FIGS. 1–4 as a hob, is shown generally at 10. The cutter comprises a generally cylindrical body member 12 having a predetermined major diameter.

Body member 12 has an axially-extending cylindrical aperture 14 centrally disposed therein which is provided with a keyway 16 to permit attachment to a mounting shaft (not shown). Both ends 18 and 20 of the body member have portions of reduced diameters, which form axial extensions 19 and 21. These reduced portions permit locking caps 22 and 24 to be attached to the ends 18 and 20 of the body member, with a portion of each extension being received in a respective recess 23 or 23' of locking caps 22 and 24. Some means are provided for securing the caps in position, as for instance, screws 27 entering through holes 26 in the locking cap and threadedly-engaging tapped recesses 28 in the body member. Each locking cap 22 and 24 has a central circular aperture 25 extending therethrough which has a diameter at least equal to the diameter of aperture 14 in the body member and, preferably, is slightly greater. Collars (not shown) maintain the cutter in position on the drive shaft against axial displacement. The side faces 30 and 32 have generally frustoconical configurations for reasons set forth in more detail hereafter.

The body member 12 has a plurality of axially-extending, generally rectangular grooves 34 equally spaced about the periphery thereof. Each of the grooves 34 is adapted to receive a blade member 36. Each groove 34 has two sides 37 and 37' extending generally parallel to one another and to the axis of the cutter assembly with the side 37 extending generally radially.

Figure 3:
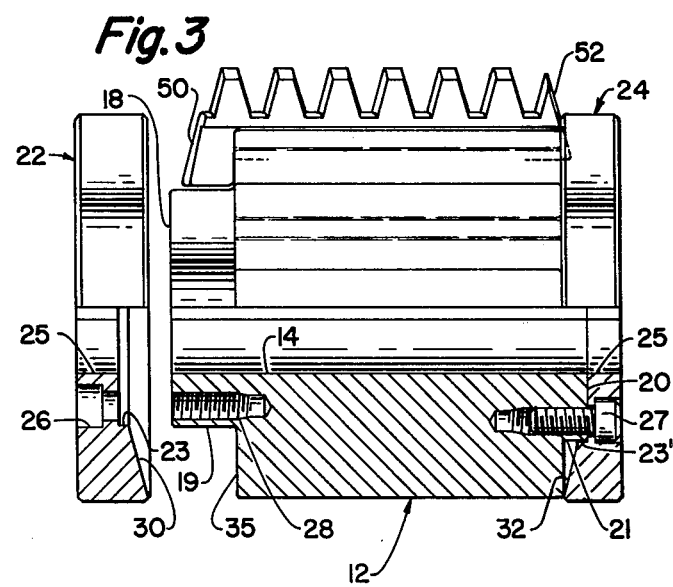
FIG. 3 is a side view in partial section of the inserted-blade cutter of the present invention with one of the locking caps removed; and, FIG. 4 is a perspective view of a blade member which is used in the cutter of the present invention.

The left axial extension 19 (as seen in FIG. 3) has a smaller diameter and greater length than the right axial extension 21. This is to provide space for portions of the blade members, also discussed in more detail below. A radially-extending, axially-directed surface 35 forms a reference-positioning surface means for the individual blade members. Although each blade has the same general configuration, it should be noted that the tooth patterns on the blades vary from one blade to the next to define an overall tooth pattern having a generally helical path, in a manner well known in the art. Further, though the hob depicted has twelve grooves equally spaced about the periphery with the trailing edge of each groove extending along a radius, the particular number and arrangement of the grooves and blades can vary, depending on the requirements of the particular gear to be cut.

Figure 4:
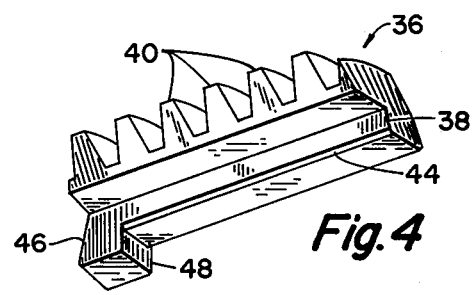
Figure 2:
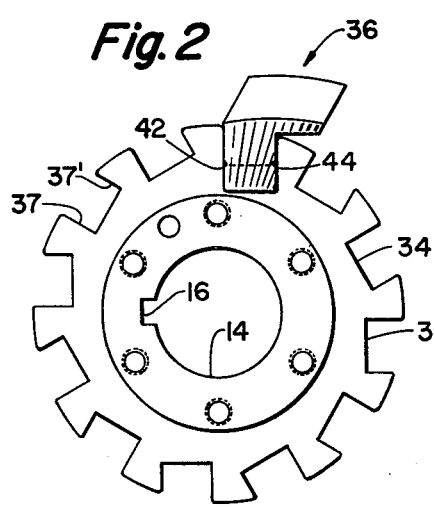
FIG. 2 is an end view of the inserted-blade cutter shown in FIG. 1 with the locking caps removed and all but one of the blades omitted for clarity.

The configuration of the blade members is most clearly shown in FIGS. 2 and 4. Each blade 36 has a generally rectangular portion 38 with teeth 40 projecting from one side thereof. The edges of the side opposite the teeth have been chamfered at 42 and 44 to facilitate insertion into the body member. The width of a blade is such that it fits snugly into a groove 34 but without the need of a shrink or press fit. The upper surfaces of the teeth 40 are curved and, when inserted into the body member, this curvature provides relief behind the cutting edge.

Each blade has integrally formed thereon, a laterally-projecting finger 46 which is generally rectangular in cross section. One side 48 of the finger forms a flat abutment means which is adapted to abut the reference-positioning surface means 35 of the body member to precisely locate the blade member axially with respect to the body. This abutment means in an essential feature of the present invention. Were the axial positions of the blades to be solely determined by locking caps 22 and 24, the precise positioning required could not be insured. The locking caps would be subject to canting relative to longitudinal axis of the body member as a result of the dimensional tolerances necessary to permit them to fit on extensions 19 and 21. This would result in misalignment of the teeth in the hob tooth pattern and even the slightest misalignment can result in the generation of a gear tooth pattern entirely different from that which is desired. It is therefore crucial that the blades be held in the appropriate relative axial relationship. The provision of the abutment means satisfies this fundamental requirement. While the abutment means has been depicted as a portion of a projecting finger, it is conceivable such means could take other forms. For example, the abutment could be a slot or groove in the blade and engage with a reference ridge on the body member.

The ends 50 and 52 of each blade member are formed with frustoconical surfaces which are complementary to those of locking caps 22 and 24, respectively. In the assembled condition, the locking caps retain the blades in the body member. The angle the conical surface forms with the axis of the assembly must be chosen to provide a sufficient radial component of clamping force. It has been found that an angle of less than or about 76° is appropriate for this purpose. The locking caps also transmit an axial clamping force to the blades. The laterally-projecting finger 46 is effectively clamped between reference positioning surface 35 and the frustoconical side 30 of locking cap 22 with the reduced diameter of extension 19 providing room for the finger.

The above disclosed inserted-blade cutter assembly represents a substantial improvement over related prior art devices. Simple removal of locking cap 22 permits replacement of one or more blades. If a cutting tooth becomes broken or cracked, only a single blade need be replaced. Once the teeth 40 have been sharpened and resharpened until the maximum utility life has been obtained from the blades, the body member and locking caps can be salvaged for reuse by simply replacing the blades. Lastly, by standardizing the blade sizes, a variety of cutting tool configurations can be made using the same body member by varying the tooth patterns of the blades which are inserted therein.

Thus it is apparent that in accordance with the invention, an inserted-blade cutter assembly has been provided which fully satisfies the objects, aims, and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and scope of the appended claims.

I claim:

1. An inserted-blade cutter assembly comprising in combination a generally cylindrical cutter body member having a predetermined diameter, a central, axially-extending cylindrical aperture traversing the length thereof and a predetermined number of axially-extending, blade-receiving grooves equally spaced about the outer periphery, each of the grooves being substantially rectangular in cross section, each end of said body member having an axially-projecting portion which has a reduced diameter, a reference-positioning surface means for each blade formed on the cutter body member; a plurality of blade members each having a portion adapted to fit in one of said grooves and an abutment means formed thereon, said abutment means adapted to abut the reference-positioning surface means to precisely locate the blade member axially relative to said body member, each outer end of the blade member having a frustoconical taper extending inwardly from the side adjacent the body toward the opposite side; a locking cap adapted to be secured to each end of the body member, each cap having a central circular aperture with a diameter at least equal to that of the aperture in the body member, and a frustoconical surface on one side of the locking cap, said frustoconical surface being complementary to that formed on the ends of said blade members whereby, when in the assembled condition, the locking caps exert both an axially-directed force and a radially-inward force of sufficient magnitude to retain the blade members in the cutter body without the need for a press fit or adhesive to thereby facilitate removal and replacement of the blade members.

2. The inserted-blade cutter assembly of claim 1 wherein one axially-projecting portion has a greater extension and lesser diameter than the other end, the axially-directed surface formed by such a stepped configuration constituting said reference-positioning surface means.

3. The inserted-blade cutter assembly of claim 2 further comprising a laterally-projecting, rectangularly cross-sectioned finger integrally formed on each blade at one end thereof, said finger being formed with the frustoconical taper on one of its sides, the side opposite said tapered side being flat and defining said abutment means.

4. The inserted-blade cutter of claim 1 wherein the frustoconical taper of the blade members forms an angle with the axis of the body member less than about 76°.

5. The inserted-blade cutter assembly of claim 1 wherein each locking cap has a circular recess coaxial with, and having a greater diameter than, the aperture therein and dimensioned to receive a portion of the respective axially-extending portion of the body member.

6. The inserted-blade cutter assembly of claim 1 wherein each blade member has a plurality of cutting teeth thereon with front cutting surfaces.

7. The inserted-blade cutter assembly of claim 6 wherein each blade member has a predetermined tooth pattern which varies from those of adjacent blade members whereby the overall tooth pattern of the cutter defines a helical path.

8. The inserted-blade cutter assembly of claim 6 wherein the cutting teeth are relieved behind said front cutting surfaces.

* * * * *